(12) United States Patent
Saitoh et al.

(10) Patent No.: US 12,379,817 B2
(45) Date of Patent: Aug. 5, 2025

(54) TOUCH PANEL AND TOUCH PANEL MANUFACTURING METHOD

(71) Applicant: Sharp Display Technology Corporation, Kameyama (JP)

(72) Inventors: Takao Saitoh, Kameyama (JP); Yohsuke Kanzaki, Kameyama (JP); Masaki Yamanaka, Kameyama (JP); Masahiko Miwa, Kameyama (JP); Yi Sun, Kameyama (JP); Masaki Fujiwara, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/704,014

(22) PCT Filed: Dec. 29, 2021

(86) PCT No.: PCT/JP2021/049012
§ 371 (c)(1),
(2) Date: Apr. 23, 2024

(87) PCT Pub. No.: WO2023/127157
PCT Pub. Date: Jul. 6, 2023

(65) Prior Publication Data
US 2024/0419290 A1    Dec. 19, 2024

(51) Int. Cl.
*G06F 3/047*  (2006.01)
(52) U.S. Cl.
CPC .... *G06F 3/047* (2013.01); *G06F 2203/04103* (2013.01)

(58) Field of Classification Search
CPC ..................... G06F 3/047; G06F 2203/04103
See application file for complete search history.

(56) References Cited

U.S. PATENT DOCUMENTS

| | | | | |
|---|---|---|---|---|
| 9,927,939 B2* | 3/2018 | Na | ........................ | G06F 3/047 |
| 11,387,293 B2* | 7/2022 | Lee | ........................ | G06F 3/044 |
| 2010/0302204 A1* | 12/2010 | Miyayama | ............ | G06F 3/0446 |
| | | | | 345/174 |
| 2017/0017335 A1* | 1/2017 | Takahashi | ............. | G06F 3/0445 |
| 2018/0164931 A1* | 6/2018 | Na | ........................ | G06F 3/0448 |
| 2020/0343313 A1* | 10/2020 | Lee | ........................ | G06F 3/044 |
| 2020/0357857 A1* | 11/2020 | Park | ..................... | G06F 3/0446 |

FOREIGN PATENT DOCUMENTS

JP          5230533 B2      7/2013

* cited by examiner

*Primary Examiner* — Benyam Ketema
(74) *Attorney, Agent, or Firm* — ScienBiziP, P.C.

(57) ABSTRACT

A touch panel includes: a first metal wire formed on an underlayer; an insulating film formed to cover the first metal wire; and a second metal wire formed on the insulating film. The second metal wire has: a first pattern extending in a first direction; and a plurality of second patterns formed to be insulated from the first pattern. The first metal wire has: a bridge pattern connecting together, in a second direction, a pair of second patterns arranged to sandwich the first pattern; and a dummy pattern formed to be insulated from the bridge pattern, the second direction intersecting with the first direction, and the pair of second patterns being included in the plurality of second patterns.

5 Claims, 9 Drawing Sheets

BECAUSE OF A LOW ETCHING RATE, A PRODUCT ADHERES SUCH THAT A SiNX FILM SERVING AS AN UNDERLAYER FILM IS NOT REDUCED.

TOUCH PANEL AND TOUCH PANEL MANUFACTURING METHOD

TECHNICAL FIELD

The disclosure relates to a touch panel and a touch panel manufacturing method.

BACKGROUND ART

A known touch panel includes: a substrate; a plurality of first detecting wires formed of electrical leads in a mesh pattern and arranged on the substrate in parallel with one another with predetermined intervals in one direction; an insulating film formed on the substrate and the first detecting wires; and a plurality of second detecting wires formed of electrical leads in a mesh pattern, and arranged on the insulating film in parallel with one another with predetermined intervals in another direction perpendicular to the one direction, and the touch panel includes dummy patterns (see Patent Document 1).

The dummy patterns include: first dummy patterns arranged in a region across the insulating film from a region between the first detecting wires adjacent to each other, and partially having the mesh pattern of the first detecting wires so that the adjacent first detecting wires appear to have a continuous mesh pattern in plan view; and second dummy patterns arranged in a region across the insulating film from a region between the second detecting wires adjacent to each other, and partially having the mesh pattern of the second detecting wires so that the adjacent second detecting wires appear to have a continuous mesh pattern in plan view.

CITATION LIST

Patent Literature

[Patent Document 1] Japanese Patent No. 5,230,533

SUMMARY

Technical Problem

There is a touch panel including: a first metal wire formed on an underlayer; an insulating film formed to cover the first metal wire; and a second metal wire formed on the insulating film. The second metal wire has: a first pattern extending in a first direction; and a second pattern formed to be insulated from the first pattern. The first metal wire has a bridge pattern at an intersection of the first pattern and the second pattern, and the bridge pattern bridges the first pattern and connects the second pattern so that the second pattern extends in a second direction intersecting with the first direction. Such a touch panel has a problem below.

The first metal wire of such a touch panel has a very tight pattern density. Hence, when dry etching is performed to form the first metal wire, the metal is removed over a large region. Hence, an appreciable difference in etching rate is observed on the surface of the underlayer, and a region etched at a higher etching rate is over-etched for a longer time. As a result, a problem develops as follows. The side shift of the first metal wire progresses in a region where the etching rate is relatively high, and the cross-section of the first metal wire is formed to be inverted-tapered. Then, a film residue of the second metal wire deposits on a level difference portion of the first metal wire, and a leak occurs between the second metal wires.

An aspect of the disclosure sets out to provide a touch panel including a first metal wire formed in a satisfactory manner, and a touch panel manufacturing method.

Solution to Problem

In order to solve the above problem, a touch panel according to an aspect of the disclosure includes: a first metal wire formed on an underlayer; an insulating film formed to cover the first metal wire; and a second metal wire formed on the insulating film. The second metal wire has: a first pattern extending in a first direction; and a plurality of second patterns formed to be insulated from the first pattern. The first metal wire has: a bridge pattern connecting together, in a second direction, a pair of second patterns arranged to sandwich the first pattern; and a dummy pattern formed to be insulated from the bridge pattern. The second direction intersects with the first direction. The pair of second patterns is included in the plurality of second patterns.

In order to solve the above problem, a touch panel manufacturing method according to an aspect of the disclosure includes: a first metal wire forming step of forming a first metal wire on an underlayer; a removing step of covering the first metal wire with a resist and removing a product produced on the underlayer at the first metal wire forming step; a delaminating step of delaminating the resist from the first metal wire; an insulating film forming step of forming an insulating film that covers the first metal wire; and a second metal wire forming step of forming a second metal wire on the insulating film. The second metal wire has: a first pattern extending in a first direction; and a plurality of second patterns formed to be insulated from the first pattern. The first metal wire has: a bridge pattern connecting together, in a second direction, a pair of second patterns arranged to sandwich the first pattern; and a dummy pattern formed to be insulated from the bridge pattern. The second direction intersects with the first direction, and the pair of second patterns is included in the plurality of second patterns.

Advantageous Effects of Disclosure

An aspect of the disclosure can provide a touch panel including a first metal wire formed in a satisfactory manner, and a touch panel manufacturing method.

DESCRIPTION OF EMBODIMENTS

First Embodiment

Figure 1:
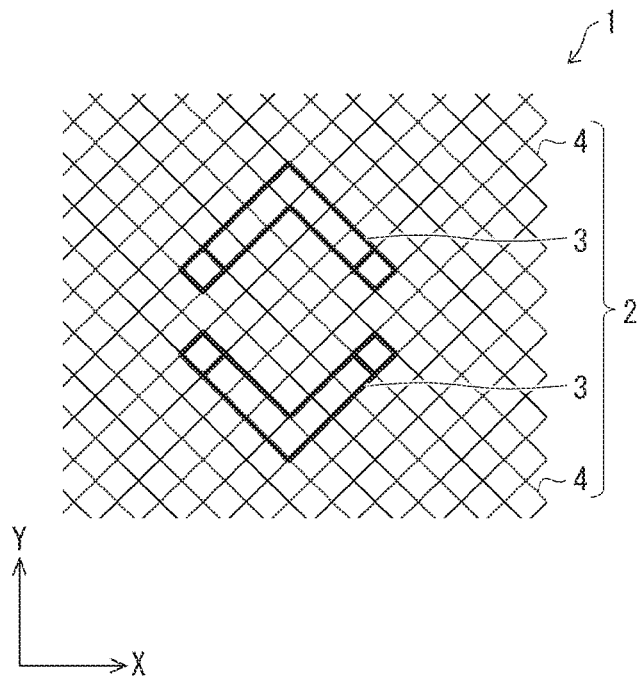
FIG. 1 is a plan view of a first metal wire provided to a touch panel according to a first embodiment.
Figure 2:
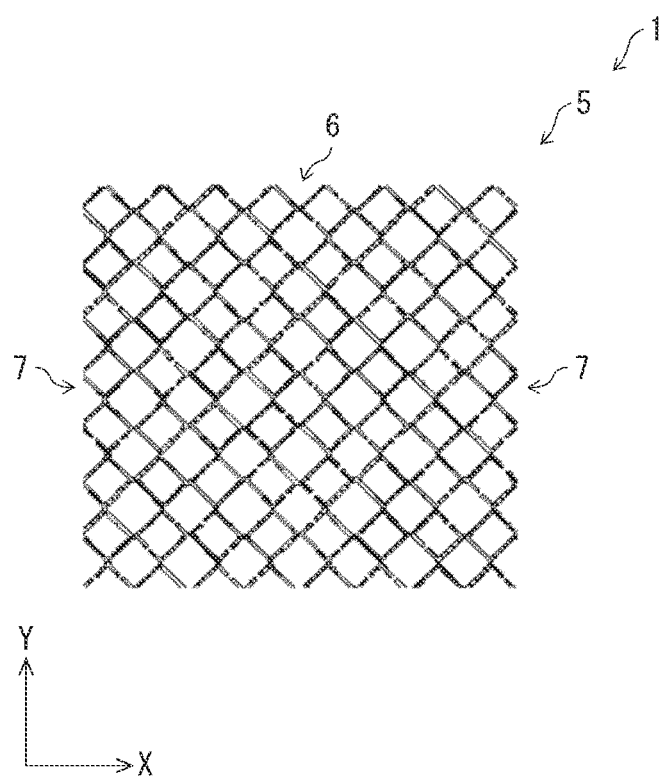
FIG. 2 is a plan view of a second metal wire provided to the touch panel.
Figure 3:
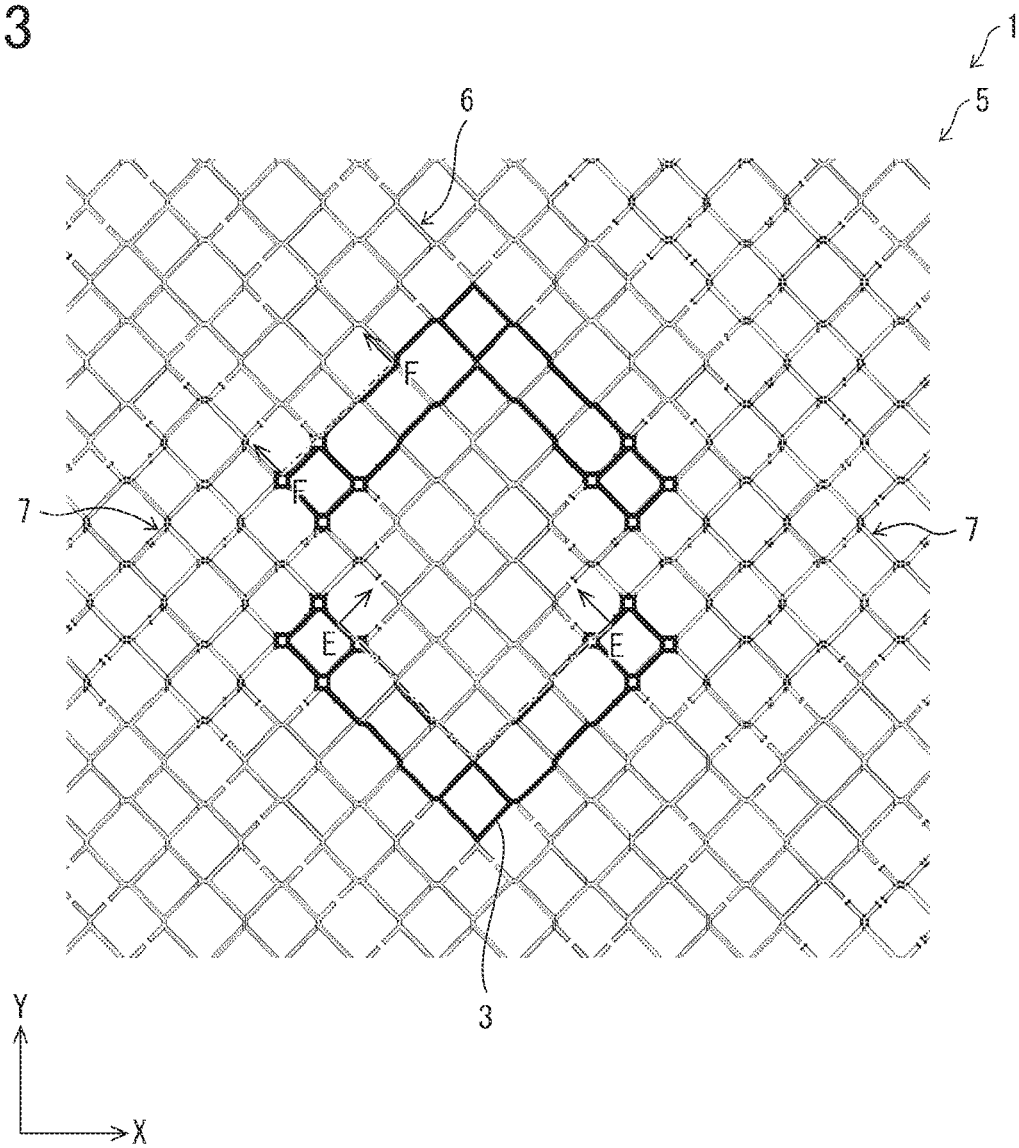
FIG. 3 is a plan view of a first pattern and a second pattern of the second metal wire.
Figure 4:
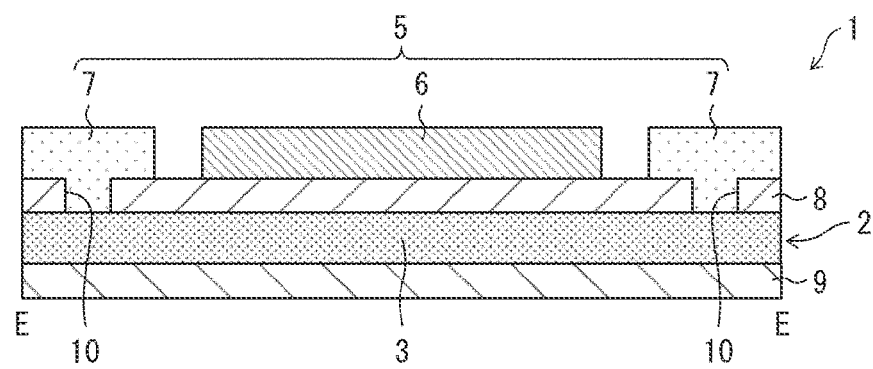
FIG. 4 is a cross-sectional view taken along V-shaped line EE in FIG. 3.
Figure 5:
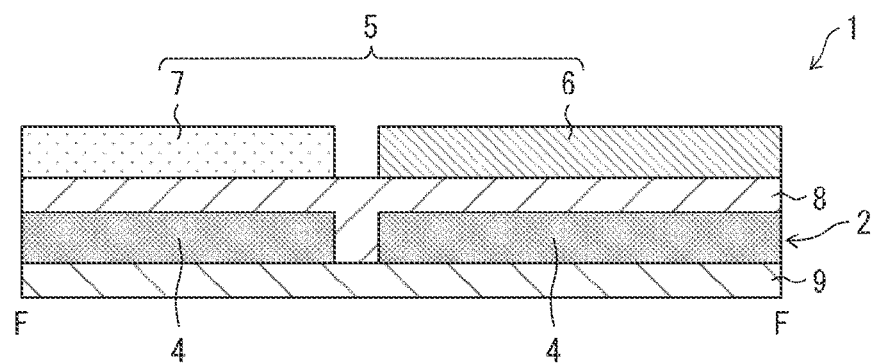
FIG. 5 is a cross-sectional view taken along line FF in FIG. 3.
Figure 6:
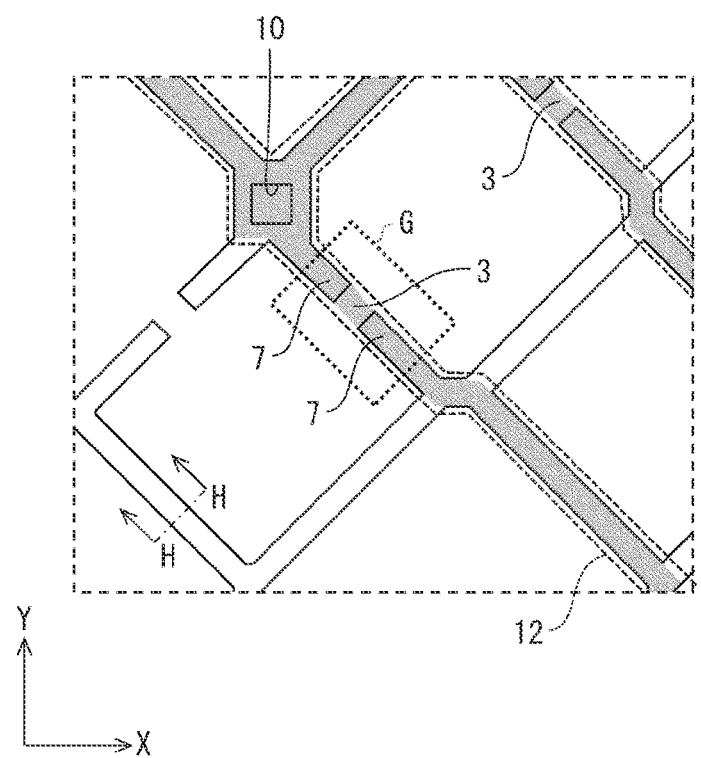
FIG. 6 is a plan view of the first metal wire overlapped with the second metal wire.
Figure 7:
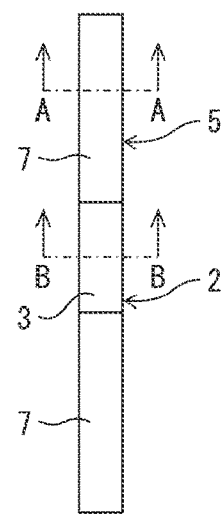
FIG. 7 is an enlarged view of a G portion in FIG. 6.
Figure 8:
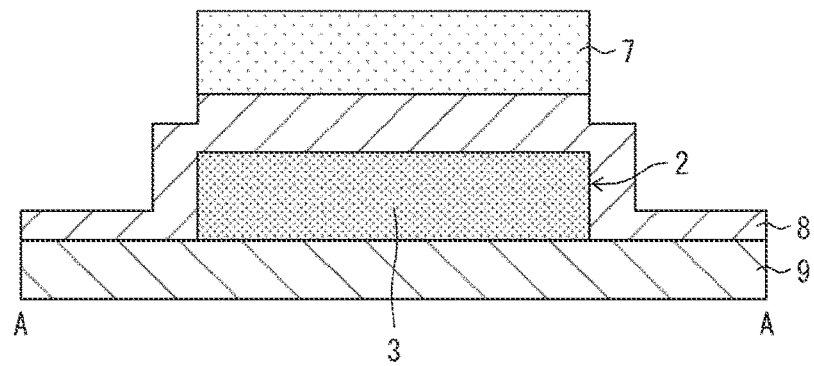
FIG. 8 is a cross-sectional view taken along line AA in FIG. 7.
Figure 9:
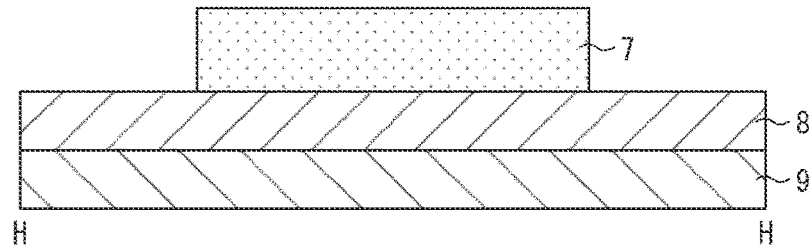
FIG. 9 is a cross-sectional view taken along line HH in FIG. 6.
Figure 10:
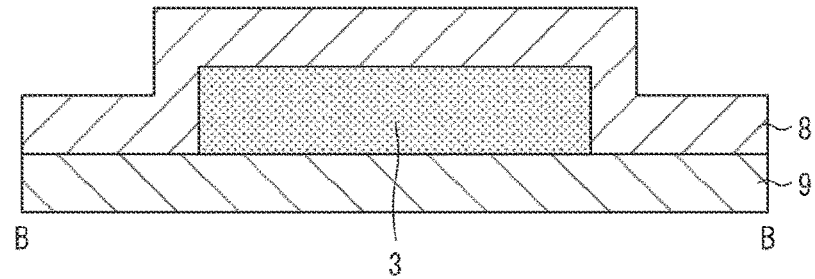
FIG. 10 is a cross-sectional view taken along line BB in FIG. 7.

FIG. 1 is a plan view of a first metal wire 2 provided to a touch panel 1 according to a first embodiment. FIG. 2 is a plan view of a second metal wire 5 provided to the touch panel 1. FIG. 3 is a plan view of a first pattern 6 and a second pattern 7 of the second metal wire. FIG. 4 is a cross-sectional view taken along V-shaped line EE in FIG. 3. FIG. 5 is a cross-sectional view taken along line FF in FIG. 3. FIG. 6 is a plan view of the first metal wire 2 overlapped with the second metal wire 5. FIG. 7 is an enlarged view of a G portion in FIG. 6. FIG. 8 is a cross-sectional view taken along line AA in FIG. 7. FIG. 9 is a cross-sectional view taken along line HH in FIG. 6. FIG. 10 is a cross-sectional view taken along line BB in FIG. 7.

The touch panel 1 includes: a first metal wire 2 formed on an underlayer 9 (see FIGS. 4 and 5); an insulating film 8 formed to cover the first metal wire 2; and a second metal wire 5 formed on the insulating film 8. The second metal wire 5 has: a first pattern 6 extending in a Y-direction (a first direction); and a second pattern 7 formed to be insulated from the first pattern 6.

The first metal wire 2 has: a bridge pattern 3 connecting, in an X-direction (a second direction), a pair of second patterns 7 arranged to sandwich the first pattern 6; and a dummy pattern 4 formed to be insulated from the bridge pattern 3.

The first pattern 6 is formed in a mesh pattern, and extends in the Y-direction. The second pattern 7 is insulated from the first pattern 6, and formed in a mesh pattern.

The bridge pattern 3 is formed in a substantially V-shaped mesh pattern as a whole, and connects together the second patterns 7 on opposing sides of the first pattern 6. The dummy pattern 4 are formed in a mesh pattern to be insulated from the bridge pattern 3.

The dummy pattern 4 is positioned to overlap with the first pattern 6 and the second pattern 7 of the second metal wire 5.

The first metal wire 2 has a multilayer structure including titanium, aluminum, and titanium.

The dummy pattern 4 is formed to correspond to the first pattern 6 and second pattern 7 of the second metal wire 5 as a whole.

The bridge pattern 3 connects, through contact holes 10, the second patterns 7 on opposing sides of the first pattern 6.

Figure 11:
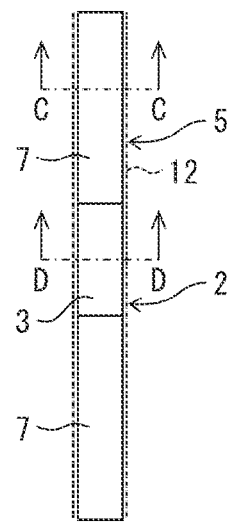
FIG. 11 is a plan view of a first metal wire included in a touch panel according to a comparative example and overlapped with a second metal wire among the above second metal wires.
Figure 12:
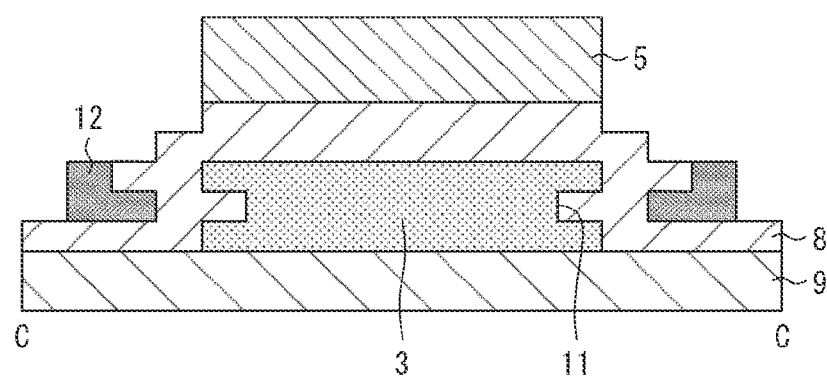
FIG. 12 is a cross-sectional view taken along line CC in FIG. 11.
Figure 13:
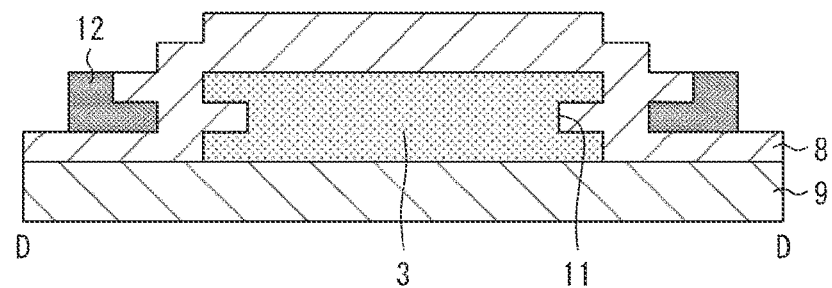
FIG. 13 is a cross-sectional view taken along line DD in FIG. 11.

FIG. 11 is a plan view of the first metal wire 2 included in a touch panel according to a comparative example and overlapped with the second metal wire 5. FIG. 12 is a cross-sectional view taken along line CC illustrated in FIG. 11. FIG. 13 is a cross-sectional view taken along line DD in FIG. 11.

The touch panel according to the comparative example omits the dummy pattern 4. Hence, the first metal wire 2 is provided with the bridge pattern 3 alone, and has a very tight pattern density. For example, a spacing between the second metal wires 5 is 30 μm to 50 μm; whereas, a spacing between the first metal wires 2 is approximately 4000 μm. Hence, when dry etching is performed to form the first metal wires 2, the metal is removed over a large region. As a result, an appreciable difference in etching rate is observed on the surface of the substrate (i.e., the underlayer 9), and a region etched at a higher etching rate is over-etched for a longer time.

For example, the region where the etching rate is relatively high is a region near a vacuum pump in the dry etching apparatus. In the region, a gas flows at a high speed. In a region where the etching rate is relatively low, a gas flows at a low speed.

In such a region over-etched for a long time, the side shift of the bridge pattern 3 of the first metal wire 2 progresses. Because aluminum exhibits a higher reactivity to a chlorine gas in dry etching than titanium, the cross-sectional shape of the bridge pattern 3 is formed to be inverted-tapered as illustrated in FIGS. 12 and 13. Furthermore, as illustrated in FIGS. 11 to 13, a film residue 12 deposits in a position corresponding to a level difference 11 of the bridge pattern 3. The film residue 12 causes an interwire leak between the second metal wire 5 and the film residue 12.

In contrast, in the first embodiment, the dummy pattern 4 is provided to the first metal wire 2 to increase the pattern density of the first metal wire 2, thereby reducing the region where the metal is removed when the first metal wire 2 is dry etched. Such a feature reduces a difference in etching rate on the surface of the substrate, progress of the side shift of the bridge pattern 3, and deposition of the film residue 12.

The dummy pattern 4 is disposed to be hidden under the second metal wire 5. Such a feature can reduce a decrease in transmittance of the touch panel 1.

As can be seen, the first metal wire 2 has: the bridge pattern 3 that connects two isolated second patterns 7; and the dummy pattern 4 that increases the pattern density of the first metal wire 2.

Figure 14:
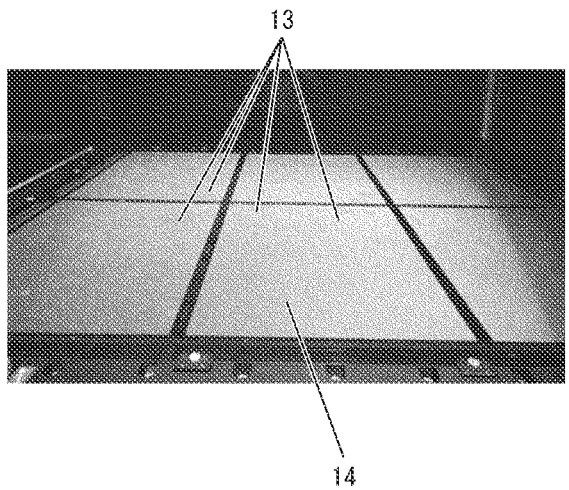
FIG. 14 is a perspective image showing a difference in etching rate between regions of the touch panel.
Figure 15:
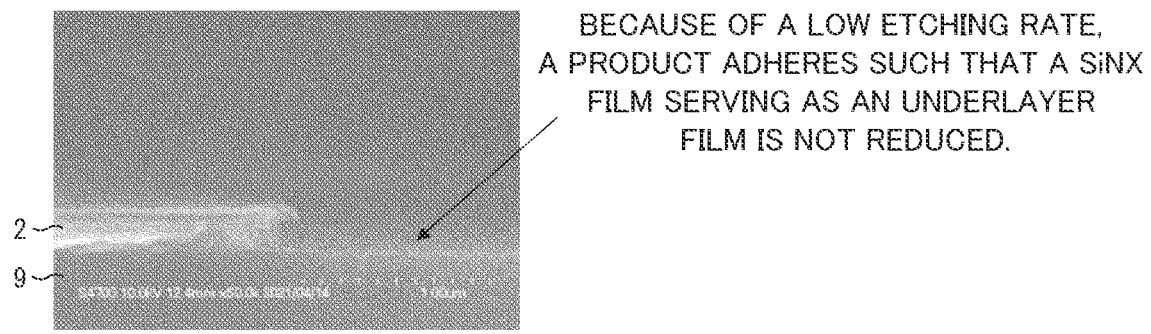
FIG. 15 is a cross-sectional image showing an etching rate in a first region of the touch panel.
Figure 16:
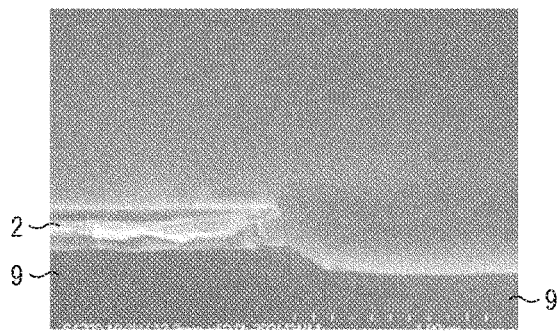
FIG. 16 is a cross-sectional image showing an etching rate in a second region of the touch panel.

FIG. 14 is a perspective image showing a difference in etching rate between regions of the touch panel 1. FIG. 15 is a cross-sectional image showing an etching rate in a first region of the touch panel 1. FIG. 16 is a cross-sectional image showing an etching rate in a second region of the touch panel 1.

When etching is performed to form the first metal wire 2, the substrate surface includes a second region 14 and a first region 13 in a mixed manner. The second region 14 exhibits a relatively high etching rate, and the first region 13 exhibits a relatively low etching rate.

When the cross-section of the first region 13 is observed, as shown in FIG. 15, the underlayer 9 is hardly reduced in thickness in a place where the first metal wiring 2 is not formed. This is probably because a product adheres to the underlayer 9.

Whereas, in the second region 14, as shown in FIG. 16, no product adheres to the underlayer 9 such that the underlayer 9 is reduced in thickness.

Such a difference in surface condition between the first region 13 and the second region 14 is visually recognized as unevenness as shown in FIG. 14.

Second Embodiment

Figure 17:
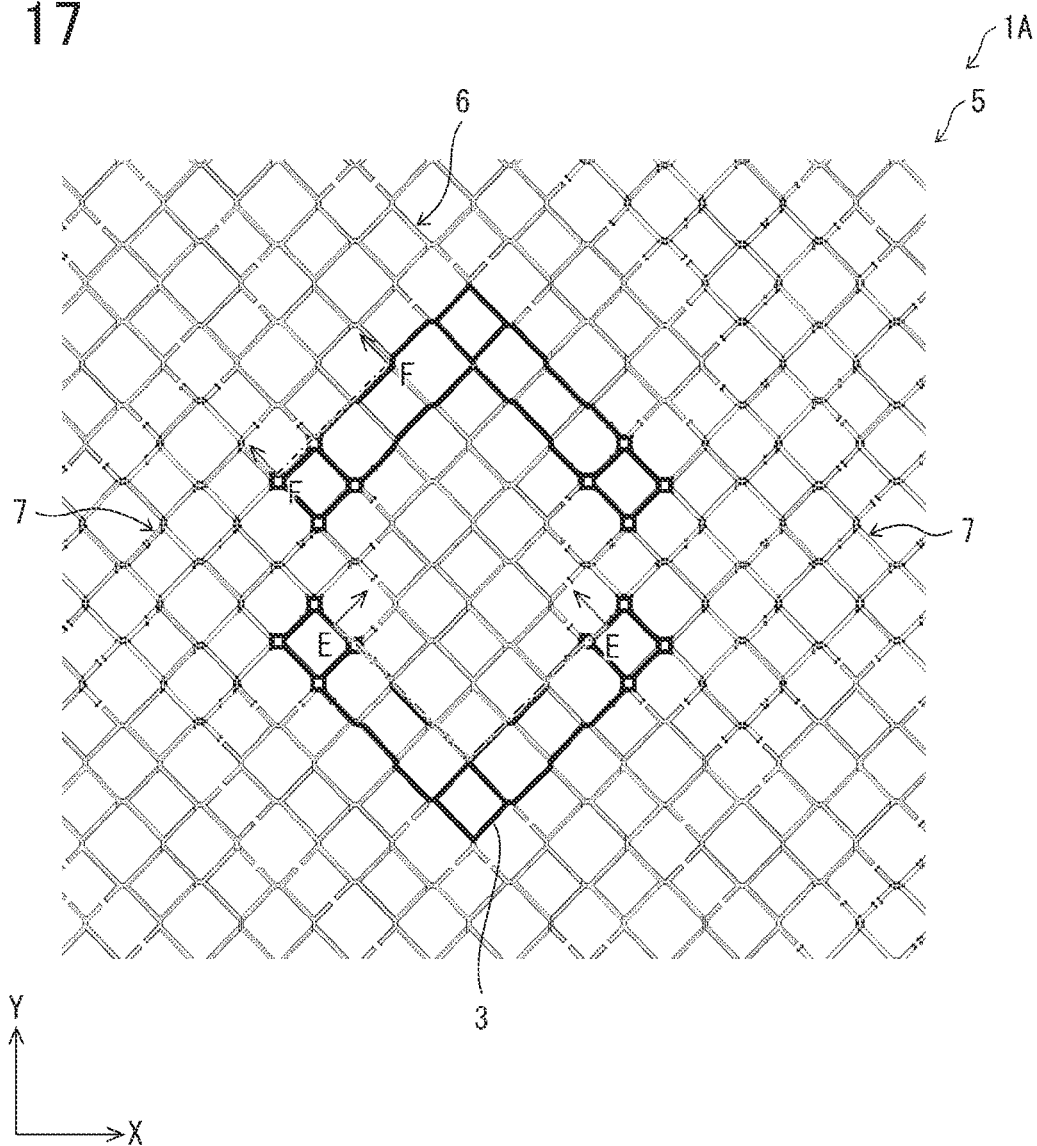
FIG. 17 is a plan view of a first pattern and a second pattern of the second metal wire of a touch panel according to a second embodiment.
Figure 18:
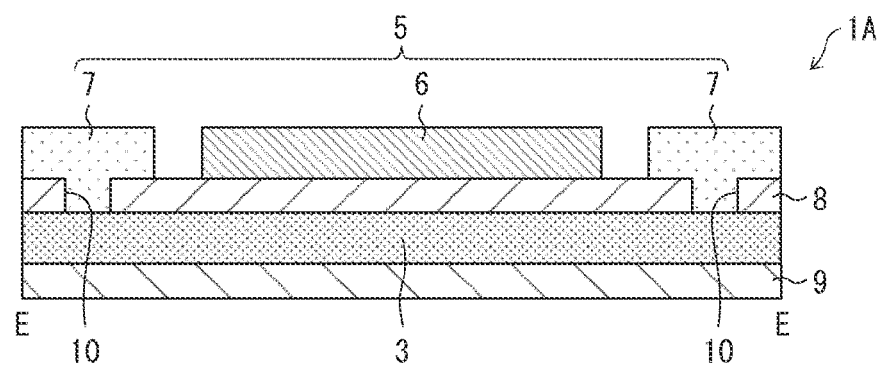
FIG. 18 is a cross-sectional view taken along V-shaped line EE in FIG. 17.
Figure 19:
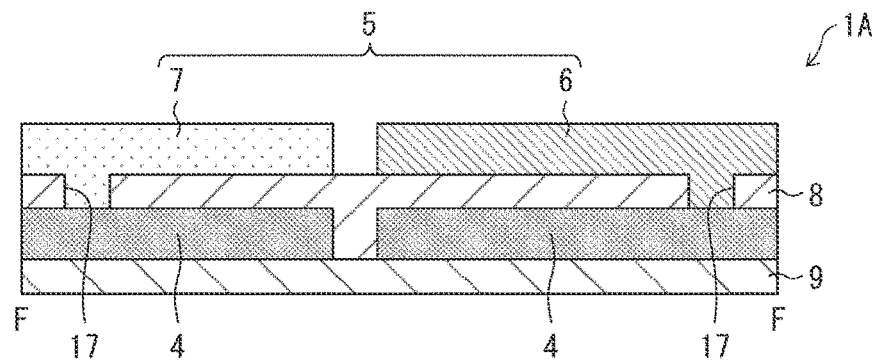
FIG. 19 is a cross-sectional view taken along line FF in FIG. 17.

FIG. 17 is a plan view of the first pattern 6 and the second pattern 7 of the second metal wire 5 of a touch panel 1A according to a second embodiment. FIG. 18 is a cross-sectional view taken along V-shaped line EE in FIG. 17. FIG. 19 is a cross-sectional view taken along line FF in FIG. 17. Identical reference signs are used to denote the identical constituent elements described before. Such constituent elements will not be elaborated upon repeatedly.

The dummy pattern 4 is electrically connected to the first pattern 6 and the second pattern 7 of the second metal wire 5, through contact holes 17 formed in the insulating film 8. Such a feature keeps the dummy pattern 4 from electrically floating.

When the dummy pattern 4 is connected to the second metal wire 5, the dummy pattern 4 connected to the first pattern 6 and the dummy pattern 4 connected to the second pattern 7 are insulated from each other in order to avoid a short circuit between the first pattern 6 and the second pattern 7 of the second metal wire 5.

Third Embodiment

FIGS. 20 to 23 are cross-sectional views showing a method for manufacturing a touch panel according to a third embodiment. Identical reference signs are used to denote the identical constituent elements described before. Such constituent elements will not be elaborated upon repeatedly.

Figure 20:
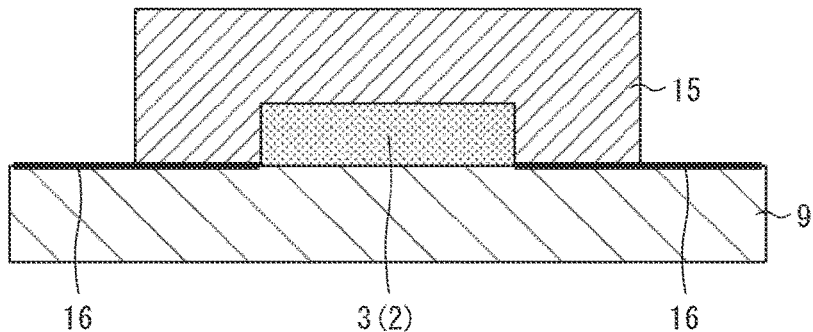
FIG. 20 is a cross-sectional view showing a method for manufacturing a touch panel according to a third embodiment.
Figure 21:
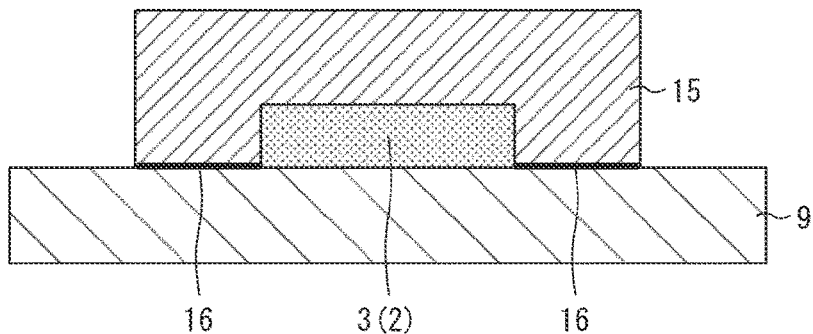
FIG. 21 is a cross-sectional view showing the method for manufacturing the touch panel according to the third embodiment.
Figure 22:
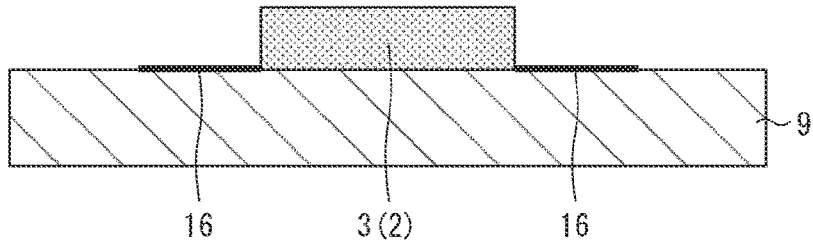
FIG. 22 is a cross-sectional view showing the method for manufacturing the touch panel according to the third embodiment.
Figure 23:
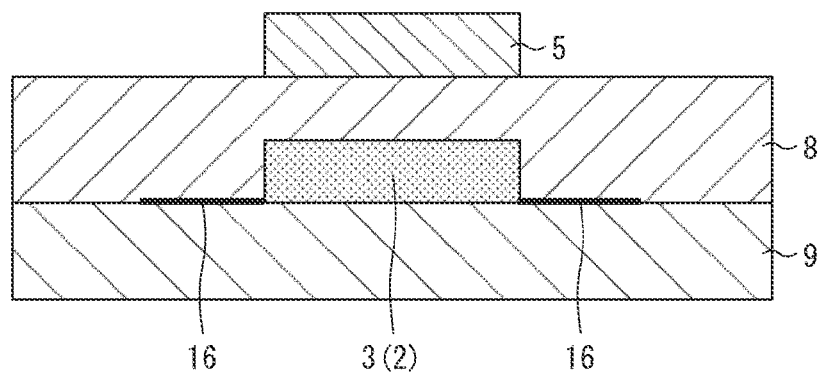
FIG. 23 is a cross-sectional view showing the method for manufacturing the touch panel according to the third embodiment.

First, as illustrated in FIG. 20, the first metal wire 2 is formed on the underlayer 9 by dry etching. The bridge pattern 3 of the first metal wiring 2 is covered with a resist 15, and dry etching is performed again. (i.e., interwire-film-residue removal etching). Then, as illustrated in FIG. 21, the interwire-film-residue removal etching is performed to remove a product 16 deposited on the underlayer 9. Next, as illustrated in FIG. 22, the resist 15 is delaminated from the bridge pattern 3 and the underlayer 9. After that, as illustrated in FIG. 23, the second metal wire 5 is formed by patterning on the bridge pattern 3 through the insulating film 8. The second metal wire 5 has the same shape as the bridge pattern 3 has.

When the bridge pattern 3 is dry-etched, the product adheres to the surface of the underlayer 9 in the first region where the etching rate is relatively low. Because no product adheres to the second region where the etching rate is relatively high, the underlayer 9 formed of SiNx is partially etched. Hence, a difference in surface roughness between the first region and the second region is recognized as unevenness.

Hence, as described above with reference to FIGS. 20 to 23, when the patterning of the bridge pattern 3 of the first metal wire 2 is completed, the resist 15 is applied to the first metal wire 2 and the interwire-film-residue removal etching is performed. Such a feature can remove most of the product in the first region while reliably leaving a pattern of the first metal wire 2.

Furthermore, if the product adheres also when the dry etching of the second metal wire 5 is completed, the same steps are additionally performed for the second metal wire 5.

The reason why the second metal wire 5 is formed in the same shape as the first metal wire 2 is that the first metal wire 2 is kept from being exposed when the second metal wire 5 is dry-etched. If the first metal wire 2 is not hidden under the second metal wire 5, the insulating film 8 is reduced in thickness in the dry etching of the second metal wire 5 and the interwire-film-residue removal etching of the second metal wire 5. As a result, the first metal wire 2 could be exposed. Hence, the first metal wire 2 and the second metal wire 5 are formed to have basically the same shape.

As can be seen, because of variations in etching rate, the film residue generated in the first region where the etching rate is relatively low can be removed.

Figure 24:
FIG. 24 is a perspective image of a touch panel when etching of the first metal wire is completed.
Figure 25:
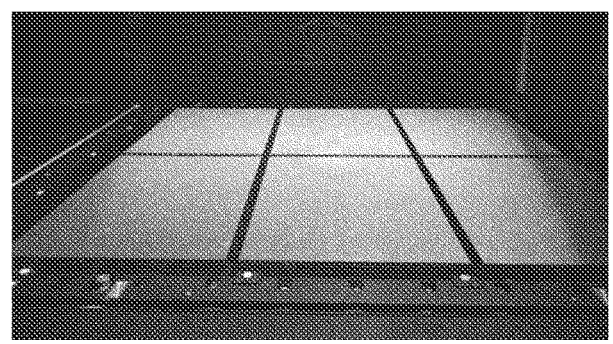
FIG. 25 is a perspective image of the touch panel when delamination of a resist covering the first metal wire is completed.

FIG. 24 is a perspective image of the touch panel 1 when the etching of the first metal wire 2 is completed. FIG. 25 is a perspective image of the touch panel 1 when the delamination of the resist covering the first metal wire 2 is completed.

From the touch panel 1 with the resist 15 of the first metal wires 2 completely delaminated, the visually recognized unevenness has disappeared.

The disclosure shall not be limited to the embodiments described above, and can be modified in various manners within the scope of claims. The technical aspects disclosed in different embodiments are to be appropriately combined together to implement another embodiment. Such an embodiment shall be included within the technical scope of the disclosure. Moreover, the technical aspects disclosed in each embodiment may be combined to achieve a new technical feature.

The invention claimed is:

1. A touch panel, comprising:
a first metal wire formed on an underlayer;
an insulating film formed to cover the first metal wire; and
a second metal wire formed on the insulating film,
wherein the second metal wire has:
a first pattern extending in a first direction, and
a plurality of second patterns formed to be insulated from the first pattern,
the first metal wire has:
a bridge pattern connecting together, in a second direction, a pair of second patterns arranged to sandwich the first pattern, and
a dummy pattern formed to be insulated from the bridge pattern, the second direction intersecting with the first direction, and the pair of second patterns being included in the plurality of second patterns, the bridge pattern is formed in a V-shaped mesh pattern as a whole, each of the first pattern, the second pattern, and the dummy pattern is formed in a mesh pattern, and the dummy pattern is positioned to overlap with the first pattern and the second pattern as a whole.

2. The touch panel according to claim 1, wherein the dummy pattern is electrically connected to the first pattern and the second pattern, and a portion of the dummy pattern connected to the first pattern and another portion of the dummy pattern connected to the second pattern are insulated from each other.

3. The touch panel according to claim 1, wherein the first metal wire has a multilayer structure including titanium, aluminum, and titanium.

4. A touch panel manufacturing method, comprising:

forming step of forming a first metal wire having a bridge pattern and a dummy pattern on an underlayer;

covering the bridge pattern with a resist and removing a product produced on the underlayer during the forming of the first metal wire;

delaminating the resist from the bridge pattern;

forming an insulating film that covers the first metal wire; and forming step of forming a second metal wire on the insulating film, wherein the second metal wire has:

a first pattern extending in a first direction, and a plurality of second patterns formed to be insulated from the first pattern, the bridge pattern connects together, in a second direction, a pair of second patterns arranged to sandwich the first pattern, the second direction intersecting with the first direction, the pair of second patterns being included in the plurality of second patterns, and the dummy pattern is insulated from the bridge pattern.

5. The touch panel according to claim 2, wherein the insulating film has a contact hole, and the dummy pattern is electrically connected to the first pattern and the second pattern through the contact hole.

\* \* \* \* \*